(12) United States Patent
Schwoerer et al.

(10) Patent No.: US 8,175,195 B2
(45) Date of Patent: May 8, 2012

(54) METHOD FOR DETECTING PATHS IN PULSE TRANSMISSION AND A DEVICE FOR CARRYING OUT SAID METHOD

(75) Inventors: Jean Schwoerer, Grenoble (FR); Benoît Miscopein, Grenoble (FR)

(73) Assignee: France Telecom, Paris (FR)

( * ) Notice: Subject to any disclaimer, the term of this patent is extended or adjusted under 35 U.S.C. 154(b) by 916 days.

(21) Appl. No.: 12/084,974

(22) PCT Filed: Nov. 7, 2006

(86) PCT No.: PCT/FR2006/002481
§ 371 (c)(1),
(2), (4) Date: May 14, 2008

(87) PCT Pub. No.: WO2007/054640
PCT Pub. Date: May 18, 2007

(65) Prior Publication Data
US 2009/0268851 A1    Oct. 29, 2009

(30) Foreign Application Priority Data
Nov. 14, 2005   (FR) ..................................... 05 11512

(51) Int. Cl.
*H04L 27/06*   (2006.01)
(52) U.S. Cl. ........ 375/340; 375/130; 375/136; 375/142; 375/145; 375/147; 375/149; 375/150; 375/316; 375/342; 375/343; 375/354; 375/371; 455/502; 455/516; 370/509; 370/510
(58) Field of Classification Search .................. 375/130, 375/136, 142, 145, 147, 149, 150, 316, 340, 375/342, 343, 354, 371; 455/502, 516; 370/509, 370/510
See application file for complete search history.

(56) References Cited

U.S. PATENT DOCUMENTS

| 5,832,035 | A | 11/1998 | Fullerton | |
|---|---|---|---|---|
| 6,556,621 | B1 | 4/2003 | Richards et al. | |
| 7,436,909 | B2 * | 10/2008 | Sahinoglu et al. | 375/340 |
| 7,505,516 | B2 * | 3/2009 | Gargin | 375/238 |
| 7,783,301 | B2 * | 8/2010 | Bornholdt | 455/456.1 |
| 7,822,098 | B2 * | 10/2010 | Sahinoglu | 375/130 |

OTHER PUBLICATIONS

Woo Cheol Chung et al., "An accurate ultra wideband (uwb) ranging for precision asset location", Ultra Wideband Systems and Technologies, 2003 IEEE Conference on Nov. 16-19, 2003, Piscataway, NJ, USA, IEEE, Nov. 16, 2003 pp. 389-393, XP010684141, ISBN: 0-7803-8187-4.

* cited by examiner

*Primary Examiner* — Leon Flores
(74) *Attorney, Agent, or Firm* — McKenna Long & Aldridge LLP

(57) ABSTRACT

The invention relates to method and device for detecting propagation paths in pulse transmission, wherein a received signal comprises pulses on each time symbol. After synchronizing a pulse-based reception, the inventive method consists (A) in determining the arrival times of pulses of the same current time symbol, (B) in generating a path hypotheses by assigning an initial score to each dated pulse, (C) in determining the arrival times of pulses of the time symbol following the current symbol, (D) in relatively comparing the arrival times of pulses of the following time symbol with the arrival times of the path hypotheses and (E) in updating scores according to the relative comparison results. Said path detecting method is suitable for pulse information transmission, in particular in UWB.

11 Claims, 5 Drawing Sheets

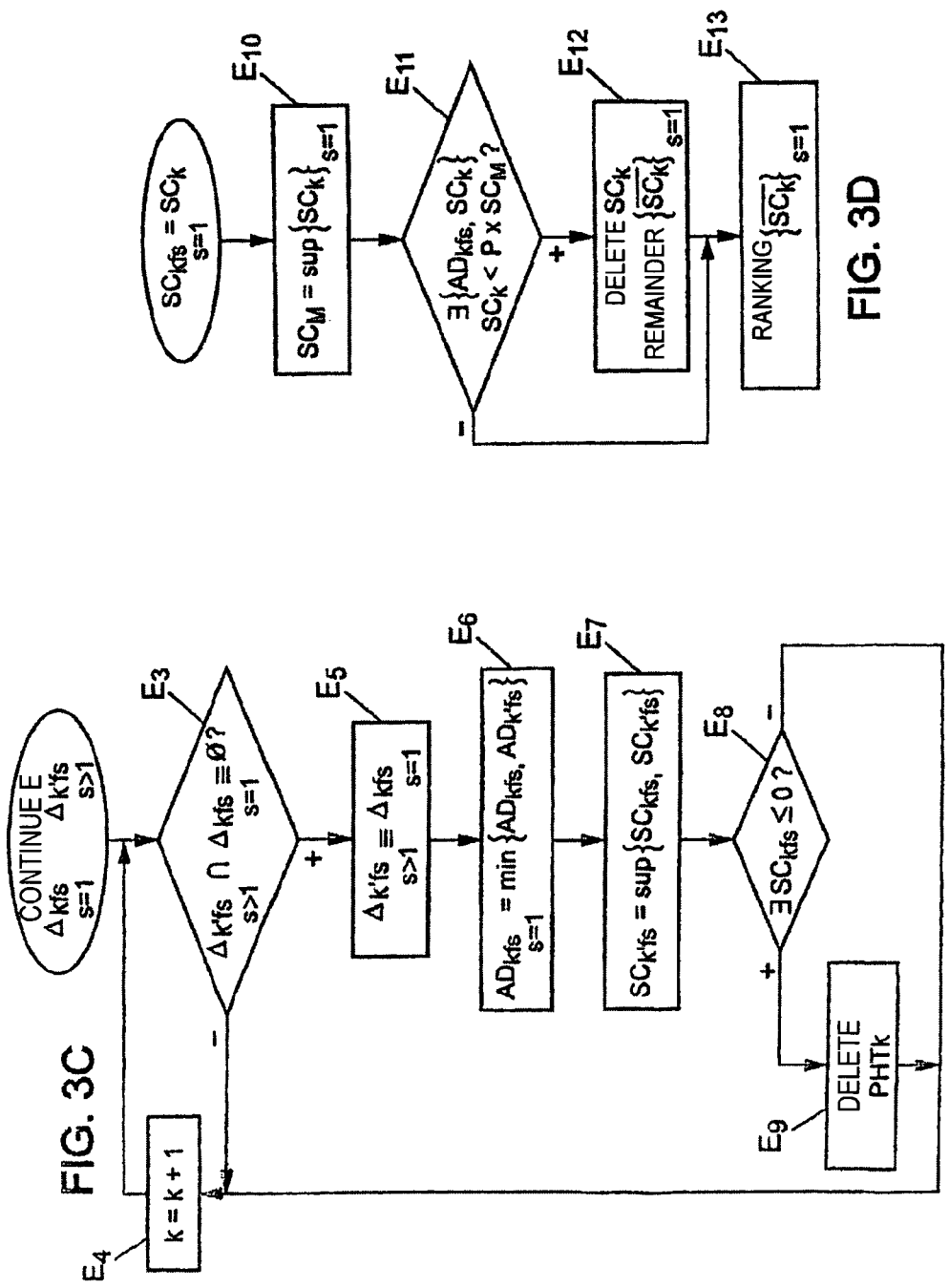

METHOD FOR DETECTING PATHS IN PULSE TRANSMISSION AND A DEVICE FOR CARRYING OUT SAID METHOD

This application claims priority from PCT/FR2006/002481 filed Nov. 7, 2006, which claims priority from French Application FR 05 11512, filed Nov. 14, 2005, both of which are hereby incorporated by reference in their entirety.

The invention relates to a method and a device for detecting paths in pulse transmission.

The emergent technique of pulse radio transmission uses the emission of the information to be transmitted by means of pulses and implements, in particular, Ultra Wide Band receivers, designated UWB receivers.

Thus a pulse signal is not a continuous signal, but a train of brief pulses, less than a nanosecond for example, of low duty ratio.

During the synchronization acquisition phase, by exploiting the a priori knowledge of a sequence, the receiver identifies this sequence, positions its start in time and extracts therefrom the sought-after time reference.

Henceforth, the receiver has detected and has latched onto a propagation path.

Now, a channel, in particular the radio channel, can comprise numerous propagation paths, from several tens to several hundreds, this having the effect of diluting the energy over the whole set of these paths.

In such a situation, the optimal processing of a single path only makes it possible, at best, to recover a few percent of the electrical energy available in the channel.

By way of illustration, FIG. 1 represents the pulse response of a radio channel in UWB reception in the case of a confined NLOS (Non Line Of Sight) channel with no direct path, termed an indoor NLOS. FIG. 1 is graduated in relative amplitude on the ordinate axis and in nanoseconds on the abscissa axis.

Depending on the application, it is therefore useful to process several propagation paths, so as to recombine them in a constructive manner, and, thus, improve the signal-to-noise ratio available on decision-taking.

The prior art solutions currently known in the field of radio transmission essentially implement sliding correlation techniques, to improve the link quality.

By way of example of processing by sliding correlation in UWB receivers, useful reference may be made to patent application PCT WO 2004/066517.

Most of the time, once the receiver has made it possible to detect a sufficiently strong path, this receiver can synchronize itself with the latter. Sliding correlation also makes it possible, when it is undertaken in full, to reveal other propagation paths, in the form of secondary-correlation peaks.

Various processing algorithms thereafter make it possible to peruse the sliding correlation result, with the aim of identifying and characterizing other propagation paths, such as the iterative algorithm termed "clean" for example.

Subsequently, when updating the selection of the paths, performed in particular because of the variability of the transmission channel, a sliding correlation is then recalculated, then a new search for paths in the sliding correlation result obtained is conducted.

The aforesaid modus operandi suffers from numerous drawbacks, because of its extreme computational unwieldiness.

In particular, the number of sequences Ns necessary to obtain synchronization, under these conditions, can take very considerable values, thereby involving a considerable duration of convergence to a synchronization state.

It is therefore not possible for a sliding correlation result to be renewed frequently, in order to obtain an update of the path selection.

Although various improvements have been made to the aforesaid solution, by using codes of JPL (Jet Propulsion Laboratory) type for example, or by executing a coarse sliding-correlation calculation, so as to unveil zones of interest on which the receiver thereafter calculates a fine correlation as described by patent application FR 05 01283 filed on Aug. 2, 2005 in the name of the Applicant. By their basic principle, all these solutions and their variants necessarily implement a coherent receiver, to the exclusion, in particular, of any receiver operating by energy detection.

In all cases, the calculation time and the correlatively necessary resources remain considerable and weigh significantly on the complexity of a pulse radio UWB receiver.

The object of the present invention is to reduce, or indeed to circumvent the drawbacks and limitations of the aforesaid prior art solutions, by dispensing with the sliding correlation process and replacing the latter with a path detection process.

The method for detecting propagation paths in pulse transmission, the signal received including pulses over symbol times, which is the subject of the invention, is noteworthy in that following the synchronization of the reception of these pulses to pulses with which a path is associated, this method includes at least the steps consisting in determining the arrival instants of at least part of these pulses of one and the same current symbol time, generating path assumptions by assigning to the pulses dated on the current symbol time an initial score, determining the arrival instants of at least part of these pulses of at least one symbol time following this current symbol time, collating in a relative manner the arrival instant of the pulses of the following symbol time with the arrival instants of the path assumptions, updating the scores of the relative collation.

The method which is the subject of the invention is furthermore noteworthy in that the determination of an arrival instant of the pulses consists at least in detecting the envelope of the pulses in relation to a threshold value, and, on positive detection, in associating at least one arrival instant with a detected pulse.

The use of envelope detection and of thresholding makes it possible to reduce the calculations and is compatible with the use of an energy-detection receiver.

The method which is the subject of the invention is furthermore noteworthy in that the relative collation consists at least in establishing time windows of determined width about the arrival instants of the pulses associated with the path assumption, and in verifying whether the pulses of the following symbol time are in at least one of the time windows.

The use of time windows makes it possible to reduce the number of assumptions generated and consequently the means necessary for the implementation of the method for detecting paths which is the subject of the invention.

The method which is the subject of the invention is furthermore noteworthy in that it includes at least the generation of a new path assumption upon a relative inconsistency between the arrival instant of a pulse of the following symbol time and the arrival instants of the path assumptions, by assigning an initial score to the pulse dated from the following symbol time.

The method which is the subject of the invention is also noteworthy in that the updating of the score assigned to each path assumption after comparison over N following symbol times includes at least the merging of the path assumptions whose reception time windows overlap, the most recent arrival instant and the highest score being preserved.

The generation of new path assumption on the following symbol times makes it possible to recover paths either attenuated or embedded in noise on the current symbol time and therefore to gain precision in the path detection. This leads to a gain in quality during utilization, in particular in transmission quality, when the paths allow the synchronization of a transmission system.

The method which is the subject of the invention is also noteworthy in that it consists in updating the path assumptions and their score by repeating the steps of path assumption generation and score assignment, by substituting the current symbol time with a symbol time following the current symbol time.

Updating the path assumptions makes it possible to preserve good precision in the detected paths and, consequently, to adapt the utilization, in particular reception, to the variability of the transmission channel.

The method which is the subject of the invention is finally noteworthy in that it consists in replacing the symbol time with a temporal subdivision of the symbol time.

Replacing the symbol time with a subdivision thereof makes it possible to use all the pulses emitted in a symbol time, when several pulses are emitted per symbol time and, consequently, to use more information on a symbol time to detect the paths, thereby improving path detection and, therefore, transmission quality.

The invention relates furthermore to a receiver of signals emitted by pulses, comprising at least one antenna for receiving pulses, noteworthy in that, in addition to a module for synchronizing reception to a pulse received, it includes at least one module for determining the arrival instants of pulses over a symbol time, a module for generating path assumptions, by assigning an initial score to the dated pulses, a module for relative collation of the arrival instants of the pulses of a symbol time with the arrival instants of the path assumptions and a module for updating the scores.

The method and the receiver which are the subjects of the invention find application in, pulse transmission, in particular radio, for example for communication, as well as to the detection of multiple paths in geolocation applications.

They will be better understood on reading the description and observing the drawings hereinafter in which, in addition to FIG. 1 relating to the prior art:

FIG. 3C represents, by way of illustration, an implementational detail of a process for updating the score assigned to each path assumption by merging the path assumptions whose reception time windows overlap;

FIG. 3D represents, by way of illustration, an implementational detail of a process for updating by ranking the score assigned to each path assumption, in a pulse radio communication application;

A more detailed description of the method of propagation path detection in pulse transmission, which is the subject of the invention, will now be given in conjunction with FIG. 2 and the following figures.

The method which is the subject of the invention applies to a signal received, in particular in the UWB band, including pulses, for example direct pulses and secondary pulses, over each successive symbol time $T_s$.

The implementation of the method which is the subject of the invention is applicable subsequent to the synchronization of the reception of the aforesaid pulses on one or more pulses with which a main path is associated.

More particularly, it is indicated that the concept of synchronizing reception corresponds to a situation where pulses are received, and repeat on each successive frame interval $T_f$, without change, with reference to the description previously mentioned. This absence of change being understood as the absence of change of the propagation conditions of the transmission channel, that is to say over a relatively brief time, equal to several symbol times.

The concept of synchronization can correspond to the synchronization of a receiver of the prior art to a so-called main pulse whose amplitude is maximal for example.

Figure 1:
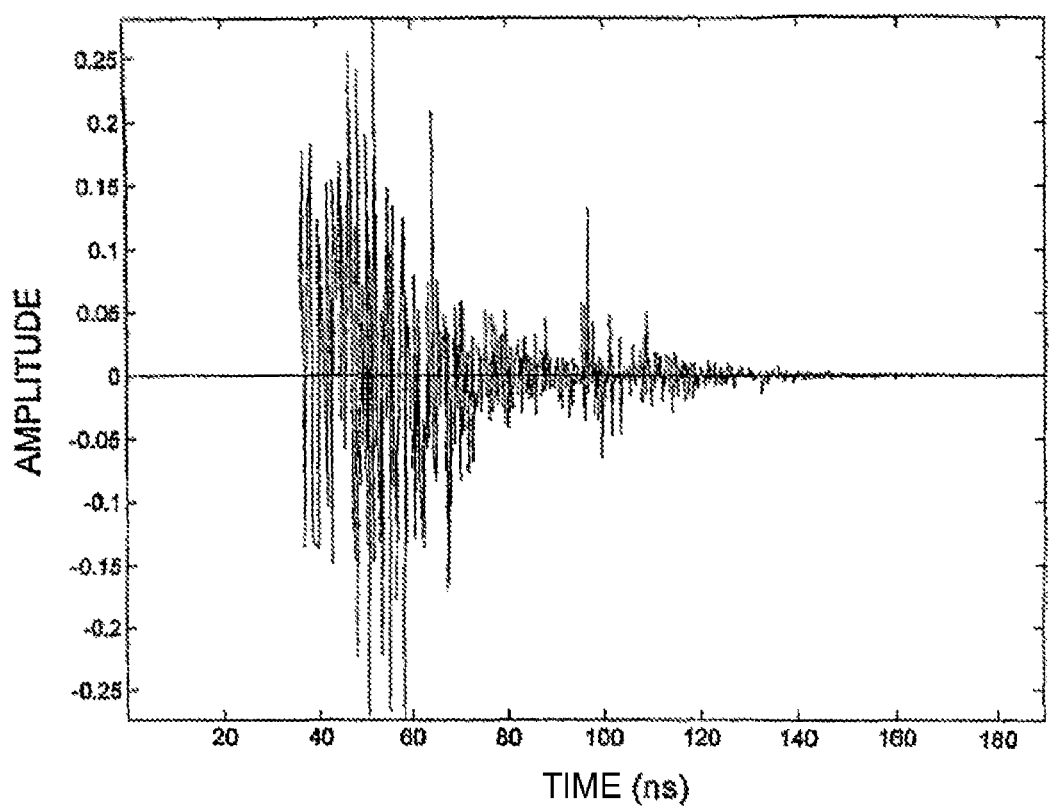
Figure 2:
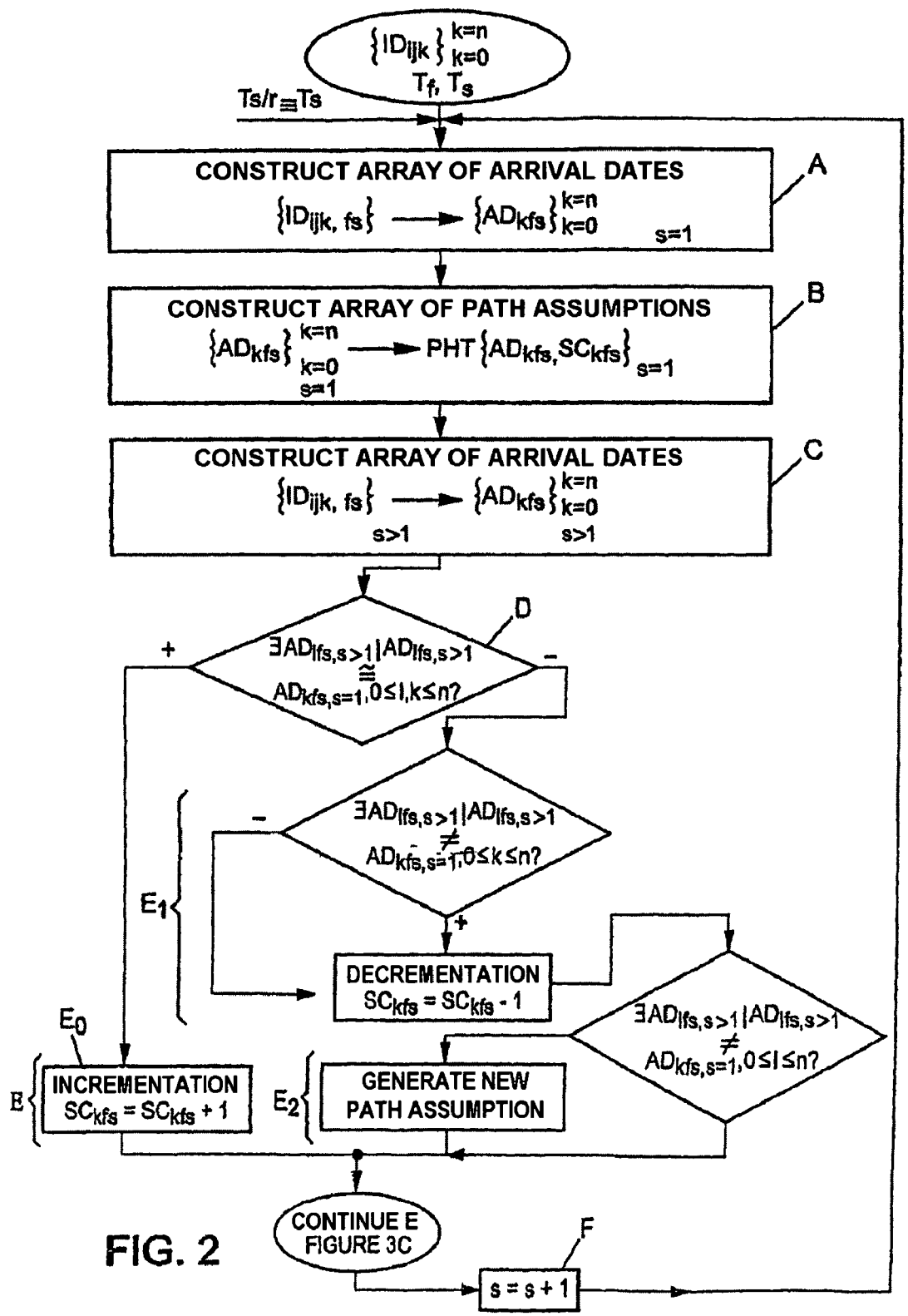
FIG. 2 represents, by way of illustration, a flowchart of the essential steps for implementing the method for detecting propagation paths in pulse transmission, which is the subject of the present invention.

With reference to FIG. 2, and for a succession of pulses after synchronization and denoted:

$$\{ID_{ijk}\}_{k=0}^{k=n}$$

and, for successive symbol times $T_s$ and frame times $T_f$ lying within the aforesaid symbol time, the method consists in determining the arrival instants of at least part of the pulses of one and the same current symbol time, in a step A, for example by constructing an array of arrival dates of the pulses of one and the same current symbol time such as indicated in FIG. 2. In FIG. 2 and for the initialization of the method which is the subject of the present invention, the current symbol time is arbitrarily equal to the first symbol time considered obtained after synchronization, i.e. for s=1.

Step A of constructing the array of arrival instants is denoted:

$$\{ID_{ijk,fs}\} \rightarrow \{AD_{kfs}\}_{k=0}^{k=n}$$

In the above relation, it is indicated that $AD_{kfs}$ designates the arrival instant of the pulse $ID_{ijk,fs}$, k representing the rank of the pulse in the symbol time considered and f representing the rank of the frame included in the symbol time considered.

The array of arrival instants can consist of any data structure allowing the bi-one-to-one mapping between a determined pulse $ID_{ijk,fs}$ and the latter's arrival instant $AD_{kfs}$. This data structure can be formed by a list, an array or a data table.

Step A is followed by a step B consisting in generating path assumptions, in particular by constructing, on the basis of the array of arrival dates, an array of the propagation path assumptions for the pulses emitted in the transmission channel as illustrated in FIG. 2. It is understood indeed that, right from the emission of a pulse at the level of the emitter, in particular pulse radio, this pulse is subjected as a function of the propagation conditions in the transmission channel to multiple paths, each pulse received therefore representing, as a function of the latter's arrival time, a potential path defined by a corresponding path assumption.

According to a noteworthy aspect of the method which is the subject of the invention, each path assumption is generated by assigning to the pulses dated at reception on the current symbol time a score $SC_{kfs}$ with an initial value, called loosely speaking the initial score.

In step B, the operation of constructing the array of path assumptions is denoted:

$$\{AD_{kfs}\}_{k=0,s=1}^{k=n} \to PHT\{AD_{kfs}\}_{s=1}$$

In the above relation, symbolizing the construction of the array of path assumptions, it is indicated that:

PHT $\{AD_{kfs}, SC_{kfs}\}$ denotes the propagation path associated with the arrival instant $AD_{kfs}$ of the pulse $ID_{ijk,fs}$, pulse and;

$SC_{kfs}$ denotes the score associated with a pulse, in particular with any pulse, whose arrival instant has been determined, the pulse therefore being dated.

Following step B represented in FIG. 2, the method which is the subject of the invention is noteworthy in that it consists, for a determined number of symbol times following the current symbol time, that is to say for s>1, in determining the arrival instants of at least part of the pulses, in particular each pulse, of at least one symbol time following said current symbol time, in particular of each following symbol time, in a step C, for example, by constructing an array of arrival dates of each following symbol time as illustrated by FIG. 2.

In step C of FIG. 2, the corresponding operation is denoted:

$$\{ID_{ijk,fs}\}_{s>1} \to \{AD_{kfs}\}_{k=0,s>1}^{k=n}$$

It is understood that the operation executed in step C, consisting in constructing an array of arrival dates of the pulses of each following symbol time is, in particular, an operation executed in the same manner as step A.

The aforesaid step C is then followed by a step D consisting in collating in a relative manner the arrival instants of the pulses of the following symbol times, in particular of the following successive symbol times, with the arrival instants of the path assumptions, so as to verify a probable correspondence of the aforesaid pulses with one of the assumptions.

In step D of FIG. 2, the collation operation is represented by the test according to the relation.

$$\exists \{AD_{kfs}\}_{k=0,s>1}^{k=n} \cong AD_{kfs,s=1}?$$

The concept of relative correspondence of the arrival instants implies the verification of the correspondence of the aforesaid arrival instants having regard to a predetermined error margin. This error may be equal to zero.

Step D is then followed by a step E, comprises the updating of the score assigned to any path assumption as a function of the result of the relative collation, so as to generate a set of path assumptions and their relevant associated score.

In a first variant of step E, this updating of the scores comprises the updating of the value of the score $SC_{kfs}$ as a function of the relative correspondence of at least one pulse of following symbol time with a path assumption.

In a second variant of step E, this updating of the scores comprises the updating of the value of the score $SC_{kfs}$ as a function of the relative inconsistency of the pulses of following symbol time with at least one path assumption.

In a third variant, step E furthermore comprises, the generation of new path assumption in the case of relative inconsistency of a pulse of following symbol time with the path assumptions. In a fourth variant, step E comprises the characteristics of the second variant of step E and/or the characteristics of the third variant of step E and/or the characteristics of the fourth variant of step E.

A nonlimiting specific modus operandi of the updating step E is represented in detail in FIG. 2.

As represented in the aforesaid figure, on positive response to the test of step D, that is to say upon a relative correspondence of a pulse of following symbol time with at least one of the path assumptions, that is to say when the relation:

$$\exists AD_{lfs,s>1}/AD_{lfs,s>1} \cong AD_{kfs,s-1}, 0 \le l,k \le n?$$

is satisfied, then in a step $E_0$, an incrementation of the score value $SC_{kfs}$ is effected, the corresponding incrementation being able to consist in adding the value 1 to the aforesaid score value.

This operation is represented by the relation $SC_{kfs} = SC_{kfs}+1$ in step $E_0$ of FIG. 2.

Conversely, on negative response to the test D of FIG. 2, that is to say upon a relative inconsistency, then in a step $E_1$ (optional) a decrementation of the score allocated to the corresponding path assumption is effected if no pulse of a following symbol time corresponds to a path assumption, that is to say when the relation $$\exists AD_{kfs,s=1}/\{AD_{lfs,s>1}\} \ne AD_{kfs,s-1}, 0 \le k \le n?$$

is satisfied.

The corresponding operation is denoted $SC_{kfs} = SC_{kfs}-1$ in step $E_1$ of FIG. 2.

In another variant of the invention, the score is decremented upon a relative correspondence and incremented upon a relative inconsistency (incrementation then being optional).

Under the assumption of a relative inconsistency between a pulse of following symbol time with the path assumptions, then the pulse of following symbol time can itself be used to generate a new path assumption.

Under these conditions, step $E_1$ is then followed by a step $E_2$ (optional) comprising the verification of the existence of a pulse of following time not corresponding to any path assumption, that is to say the verification of the following relation:

$$\exists AD_{lfs,s>1}/AD_{lfs,s>1} \ne \{AD_{kfs,s-1}\}, 0 \le l \le n?$$

And the generation a new path assumption corresponding to the arrival instant $AD_{kfs,\,s>1}$ of the pulse of aforesaid following symbol time.

Step E can then be followed by a continuation for updating the assigned score designated "Continue E FIG. 3c" in FIG. 2, this continuation being optional however.

Of course, the method which is the subject of the present invention can be implemented on the current symbol time, i.e. s=1, and on a plurality N of following symbol times.

However, and according to a particularly advantageous implementation of the method which is the subject of the invention, the latter can be implemented in an adaptive manner so as to update the path assumptions and their associated score by repeating the steps of path assumption generation and score assignment (steps A to E), by substituting the current symbol time s=1 with a symbol time following the current symbol time, for example s=s+1 symbol time immediately following the current symbol time or or s=s+n nth symbol time following the current symbol time.

This operation is represented by step F of FIG. 2 by the incrementation s=s+1 consisting in continuing the whole process, the current symbol time becoming the symbol time s=2, incremented successively and the following symbol times successively becoming the symbol times 3 to N+1 and so on and so forth, by return, subsequent to step F, to step A of FIG. 2.

It is understood that by an implementation, such as represented in FIG. 2, of the method of the present invention, this implementation makes it possible in a particularly advantageous manner to adapt reception to the variability of the transmission channel. The value of n will therefore be dependent on the variability of the channel: the more rapidly the channel varies, the closer n will be to 1 or equal to it, thus allowing an update every symbol time or practically; and the more slowly the channel varies, the larger n will be, making it possible to update in a very widely spaced manner. Thus the tempo of updating can be suited to the type of channel, thus making it possible to reduce the update calculations to those useful for following the channel.

A more detailed description of a preferential process for determining an arrival instant of the pulses of one and the same symbol time will now be given in conjunction with FIG. 3A.

For the determination of the arrival instants of the aforesaid pulses, the same starting assumption as in the case of FIG. 2 is considered, namely that the whole set of pulses $\{ID_{ijk}\}_{k=0}^{k=n}$ is available over the whole set of successive symbol times $T_s$ and over the whole set of frames $T_f$.

Figure 3A:
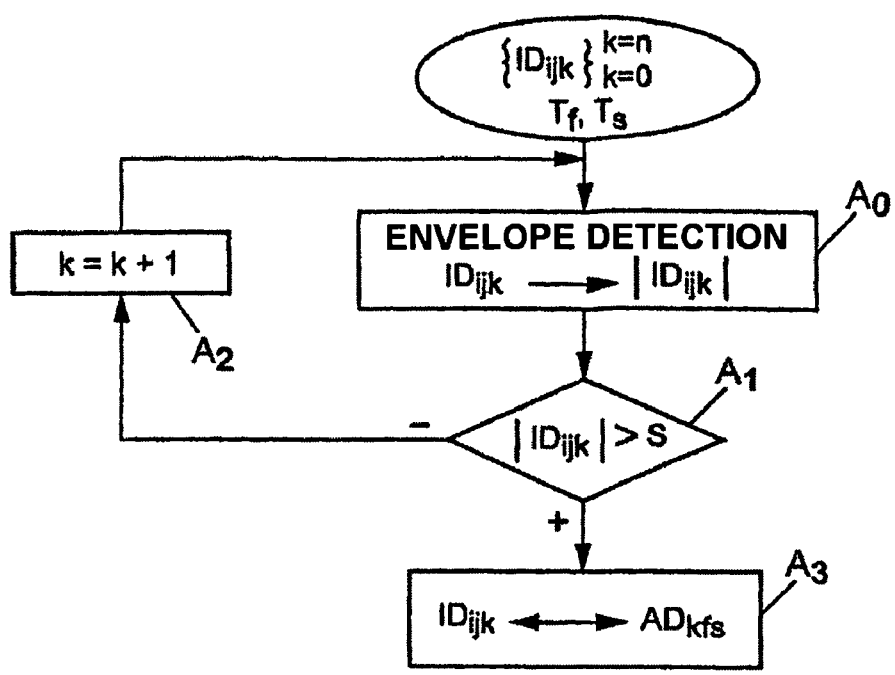
FIG. 3A represents, by way of illustration, an implementational detail of step A of determining the arrival instants of FIG. 2, for the current symbol time.

The process for determining an arrival instant, as represented in FIG. 3A, consists, in a step A0, in detecting the envelope of at least part of the pulses, in particular of each pulse: this operation being denoted: $ID_{ijk} \rightarrow |ID_{ijk}|$.

The envelope detection can be performed on the analog signal received at reception on the basis of any envelope alignment or detection circuit known in the prior art and which for this reason will not be described in detail.

In the above relation, it is understood of course that $|ID_{ijk}|$ in fact denotes the amplitude of the analog signal of each detected pulse, that is to say the value of their envelope.

The step A0 can then be followed by a step A1 consisting in comparing the detected envelope value $|ID_{ijk}|$ with the value S by superiority comparison.

On negative response to the test A1, the pulse whose envelope value does not have a sufficient amplitude in relation to the threshold value is ignored, this operation being represented by step A2 of going to the following pulse k=k+1, and by the return to step A0 for the detection of the following pulse.

Conversely, on positive response to step A1, the latter is followed by a step A3, which consists in associating at least one arrival instant with each detected pulse. In a variant of the invention, this instant is determined in a manner relative and local to the symbol time. This operation is denoted by the relation $ID_{ijk} \leftrightarrow AD_{kfs}$.

It is understood, specifically, that the concept of determined instant for a detected pulse is advantageously relative instant because of the repetition of the pulses for each symbol time $T_s$ and therefore of the substantially identical arrival date of the pulses repeated on each symbol time, except for the existence of a variability of the channel, as mentioned previously in the description.

The arrival instants can be expressed in the form of a real number corresponding to a fraction of the symbol time $T_s$. This measure is particularly advantageous insofar as the precision of the arrival instant is thus complied with, the symbol time being known with high precision at the level of each receiver.

A preferential process for implementing the relative collation of the pulses will now be described in conjunction with FIG. 3B.

For the implementation of the aforesaid collation in a relative manner, we consider the arrival instants of the path assumptions, that is to say, in particular, for any pulse belonging to the current symbol time, arrival instant $AD_{kfs}$ for s=1, and the arrival instants of the dated pulses, for any following symbol time, i.e. arrival instants $AD_{kfs}$ s>1.

Figure 3B:
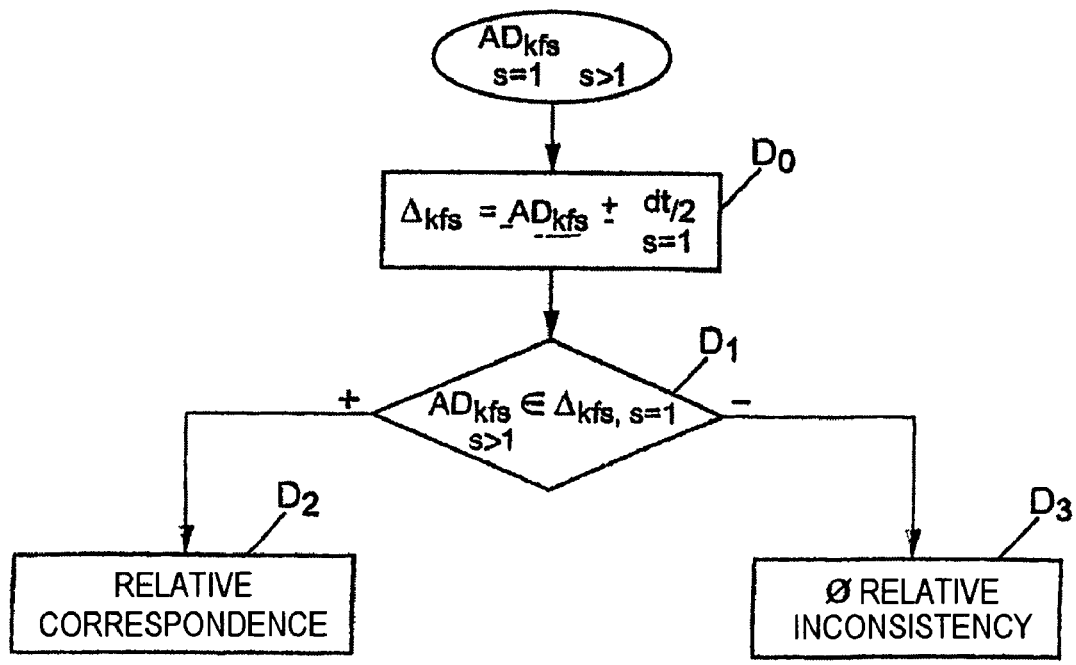
FIG. 3B represents, by way of illustration, an implementational detail of step D consisting in collating in a relative manner the arrival instants of the pulses of a following symbol time with the arrival instants of the path assumptions.

The relative collation operation, represented in FIG. 3b, advantageously consists, in a step $D_0$, in establishing reception time windows of determined width dt about the arrival instants of the path assumptions, that is to say at the arrival date $AD_{kfs, s=1}$. In step $D_0$, this operation is denoted:

$$\Delta_{kfs, s>1} = AD_{kfs, s=1} \pm dt/2.$$

In the above relation dt represents the value of the determined width of the time window considered and $\Delta_{kfs}$ represents the reception time window considered about the arrival instant of the path assumptions at the instant $AD_{kfs, s=1}$.

Step $D_0$ is followed by a step $D_1$ consisting in verifying whether pulses of the following symbol time are in at least one of the reception time windows.

The verification operation in step $D_1$ is denoted according to the relation:

$$AD_{kfs, s>1} \in \Delta_{kfs, s=1}$$

The test of the step $D_1$ makes it possible to conclude that there is a relative correspondence on verification of the presence of a pulse of the following symbol time in at least one time window in positive response to the test $D_1$, this relative correspondence being noted in step $D_2$.

Conversely, the negative response to the test $D_1$ makes it possible to note the relative inconsistency because of the fact that none of the pulses of the following symbol time are in the reception time window in step D3.

Various indications of nonlimiting preferential implementation of the updating process and, in particular, of the continuation E indicated in FIG. 2 will now be given in conjunction with FIG. 3C and FIG. 3D Firstly, with reference to FIG. 2, it is indicated that step $E_2$ of generating a new path assumption for updating any new path assumption can advantageously consist for any relative inconsistency of at least one pulse of following symbol time, associated with the new path assumption, with the existing path assumptions in assigning an initial score to the pulse of following symbol time and to the new path assumption. It is understood, of course, that any new path assumption can be thus defined by assigning the value of the initial score, so as to insert any new path assumption into the set of path assumptions.

In a nonlimiting preferential mode of implementation, for the purpose of improving the detection precision of the method which is the subject of the present invention, the updating of the score assigned to each path assumption, after comparison over N following symbol times, can advantageously include, as represented in FIG. 3C, the merging of the path assumptions whose reception time windows overlap, the most recent arrival date and the highest score being preserved and allocated to the merged path assumption retained.

Furthermore, in a variant of the invention, and with reference to FIG. 3C, the updating process also consists in deleting the path assumptions whose allocated score has become zero or negative. This step of deleting the assumptions of zero or negative score is performed without prior merges of the path assumptions in a variant of the invention. If the score is decremented upon relative correspondence, the deleted path assumptions will not be the negative assumptions but the positive ones.

The whole set of aforesaid operations is represented in the aforesaid figure in the manner hereinafter.

Subsequent to the implementation of the relative collation step, the reception time windows denoted $\Delta_{kfs, s=1}$ for the current symbol time and $\Delta_{k'fs, s>1}$ for the following symbol times are of course available.

It is understood, in particular, that k' is a value which can correspond to the value k of the pulse of current symbol time but whose arrival instant is, however, slightly different because of the variability of the transmission channel from one symbol time to the following time.

Thus, with reference to FIG. 3C, the process for merging the path assumptions whose reception time windows overlap can consist in executing a test $E_3$, making it possible to verify the overlap, that is to say the intersection of the aforesaid time windows according to the relation:

$$\Delta_{k'fs, s>1} \cap \Delta_{kfs, s=1} = \phi?$$

The concept of intersection can consist, as previously mentioned, in performing tests of inferiority and or of superiority of the limit values of the corresponding windows, for example.

Step $E_3$ on negative response to the aforesaid test is followed by a step $E_4$ of return to the test $E_3$, with incrementation of the value k to the value k+1, so as to go to the following pulse. This process thus makes it possible to verify the absence of overlap of the time windows associated with the pulses of rank k considered.

Conversely, on positive response to the test $E_3$, a step $E_5$ is called corresponding to the merging proper of the aforesaid time windows, according to the symbolic relation:

$$\Delta_{k'fs,s>1} \equiv \Delta_{kfs,s=1}$$

With the operation $E_5$ is thereafter associated an operation $E_6$ consisting in allocating the most recent arrival date to the window merged in step $E_5$, and then a step $E_7$ consisting in assigning the higher score of the two initial windows to the merged window.

These operations are represented by the relations:

$$AD_{kfs,s=1} = \min\{AD_{kfs}, AD_{k'fs}\} \text{ for step } E_6, \text{ and}$$

$$SC_{kfs} = \sup\{SC_{kfs}, SC_{k'fs}\} \text{ for step } E_7.$$

As regards the deletion of the path assumptions, whose allocated score has become zero or negative, this operation is carried out in step $E_8$ consisting in comparing each allocated score value $SC_{kfs}$ with the value 0 by inferiority comparison.

On positive response to the test of step $E_8$, denoted $\exists SC_{kfs} \leq 0?$, the corresponding path assumption denoted $PHT_k$, whose allocated score has become zero or negative, is then deleted in step $E_9$. Step $E_9$ is followed by a return to step $E_3$ by way of step $E_4$ to go to any following pulse by incrementation k=k+1.

Conversely, on negative response to the test $E_8$, the return to step $E_3$ is performed directly by way of step $E_4$ to go to the pulse of following rank.

In addition to eliminating the overlapping path windows, that is to say finally the pulses whose distance on a symbol time is not sufficient, the method which is the subject of the invention, such as represented in FIG. 3D, can advantageously consist in updating the score assigned to each path assumption, so as to obtain the best path assumptions, that is to say the most significant and ultimately the most likely.

With this aim, a variant of the method which is the subject of the invention comprises a step of eliminating the path assumptions whose score is less than a determined percentage of the highest score. Another variant of the method which is the subject of the invention comprises a step of ranking in order of decreasing score of the remaining path assumptions. An additional variant of the method which is the subject of the invention comprises the elimination step followed by the ranking step.

Such a process illustrated in FIG. 3D can be executed on scores of the path assumptions retained following the implementation of the steps of FIGS. 3B and 3C in particular.

Thus, all the scores $SC_{kfs, s=1}$, which by way of simplification are denoted $SC_k$, are available for the current symbol time.

The process then consists in a step $E_{10}$ in determining the highest score. This score is denoted:

$$SC_M = \sup\{SC_k\}_{s=1}$$

This operation is carried out by virtue of a conventional procedure for sorting numerical value of scores.

Step $E_{10}$ is followed by a test step $E_{11}$ consisting in discriminating all the path assumptions whose score is less than a percentage P of the highest score $SC_M$. The test of step $E_{11}$ is represented by the relation:

$$\exists \{AD_{kfs}, SC_k\} SC_k < P \times SC_M?$$

On positive response to the aforesaid test $E_{11}$, the corresponding score value $SC_k$ is deleted in a step $E_{12}$, the set of scores remaining being denoted $\{\overline{SC_k}\}_{s=1}$.

After deleting all the scores that have satisfied the test of step $E_{11}$, the ranking in order of decreasing score of the remaining path assumptions is effected, this operation being denoted:

RANKING $\{\overline{SC_k}\}_{s=1}$ in step $E_{13}$.

Of course, when, in the test of step $E_{11}$, no score satisfies the aforesaid inferiority comparison test, then we go directly to the sorting step $E_{13}$, the ranking occurring over the set of scores and path assumptions remaining.

The modus operandi such as represented in FIG. 3D appears particularly advantageous, insofar as it makes it possible, furthermore, to select a determined number of path assumptions from among those whose score is highest, that is to say subsequent to the ranking performed in step $E_{13}$.

This makes it possible to ensure the communication between pulse emission and reception on the basis of the propagation paths whose scores are highest and which ultimately represent the most reliable propagation paths, in particular because these paths are the stablest.

Finally, the method which is the subject of the invention can comprise, furthermore, a step of validating each path assumption as path of at least part of the pulses.

With this aim, the aforesaid validation can be performed by resorting to the procedure for synchronization on reception such as described previously in the description.

However, in the case where the depth of the transmission channel is low (less than a predetermined value), the depth of the channel being defined as the time separating the first detectable pulse from the last detectable pulse over the symbol time, the validation step can be implemented for at least part of the pulses, or indeed each pulse, associated with the pulse of a symbol time, on which the reception is synchronized. The pulses are then limited to those whose path deviation in terms of propagation time in relation to the main pulses (pulses with which a path on which the synchronization has been performed is associated), is less than the depth of the transmission channel.

Reception being synchronized, the synchronization sequence tied to each of the candidate main pulses is known. This information makes it possible to identify a reduced number of synchronizations.

It is then possible to communicate the position of the detected pulse as well as the probable assumptions of position of the latter to the synchronization function. If the latter succeeds in acquiring a synchronization, which may however require several symbol times $T_s$, on these bases, this indeed signifies that a new path has been detected and, of course, is utilizable.

A more detailed description of a device implemented, in particular by a receiver and of such a receiver in an exemplary application consisting in the case of the ultra wideband reception of radio signals emitted in pulses, executing the method for detecting propagation paths in pulse transmission in accordance with the subject of the invention, will now be given in conjunction with FIG. 4.

With reference to the aforesaid figure, it is indicated that in addition to an antenna for receiving pulses, in particular direct pulses and secondary pulses, this receiver comprises a module for synchronizing reception on a main pulse received, this synchronization module being able, for example, to consist of any existing module of a conventional receiver, without departing from the scope of the subject of the present invention. For this reason, such a module is not represented in the drawing in FIG. 4.

The device for detecting paths which is the subject of the invention implemented by the receiver includes at least one module 1 for detecting the envelope of the pulses received in relation to a threshold value, making it possible to generate detected pulses. This module can consist of a sub-module $1_0$ for detecting the envelope and a sub-module $1_1$, performing the comparison of the envelope signals with the threshold value, denoted AT in the aforesaid FIG. 4.

The module 1 for detecting the envelope of the pulses is followed by a module 2 for determining the arrival instants of at least part of the detected pulses of a symbol time, which part can be delivered in the form of a calibrated pulse to the aforesaid module 2, it being possible for this arrival instant to be relative and local to the symbol time. In a variant of the invention, the module 2 furthermore allows the storage of an array of arrival instants, referenced 3 in the aforesaid FIG. 4. The form and the content of the information of the array of arrival instants correspond to those indicated previously in the description.

Figure 4:
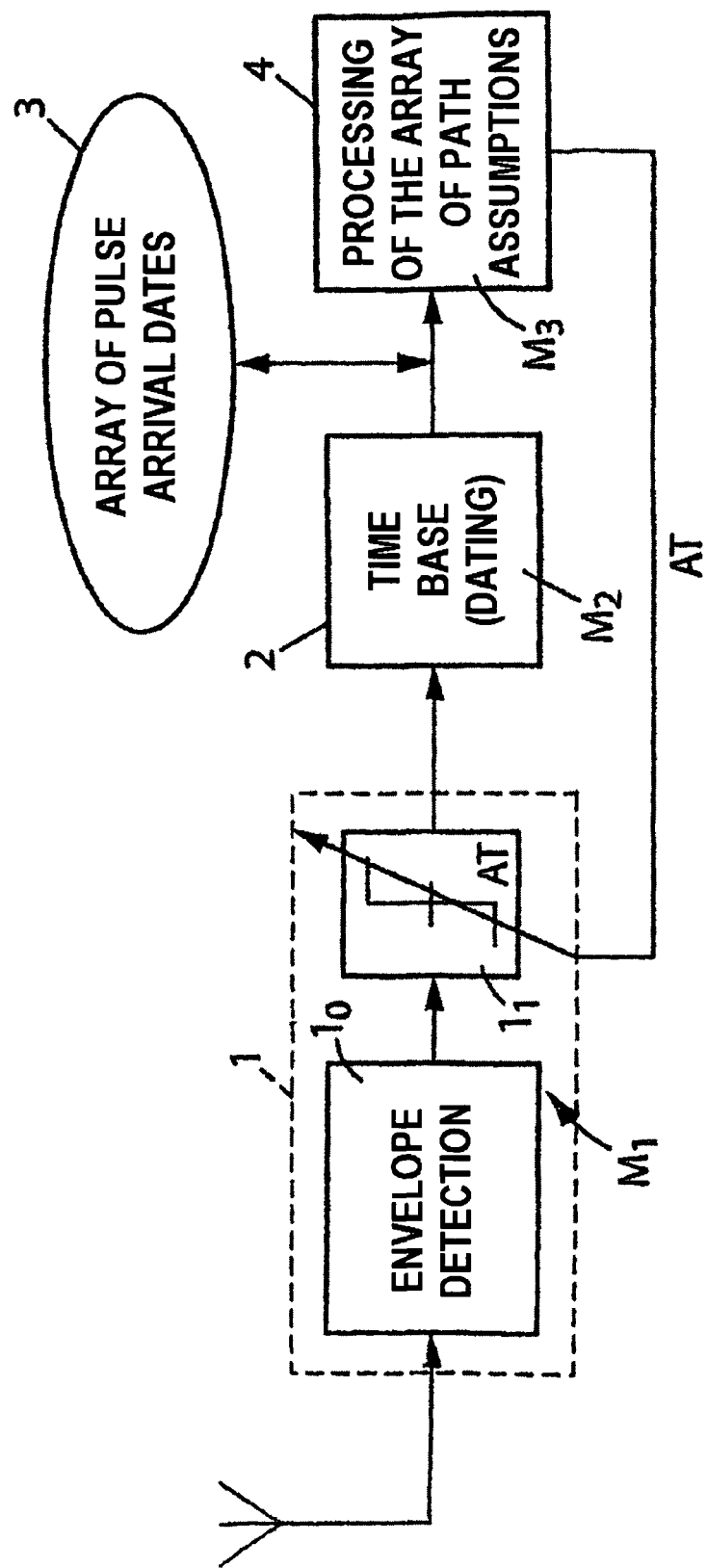
FIG. 4 represents, by way of illustration, a receiver in accordance with the subject of the present invention.

Furthermore, as represented in FIG. 4, the device for detecting paths, which is the subject of the invention, comprises a module 4 for processing the assumptions comprises means for generating path assumptions by assigning an initial score to dated pulses, means for relative collation of the arrival instants of the pulses with the assumptions and means for updating the scores as a function of the result of the collation. For example, on the basis of the array of arrival instants 3, the module 4 constructs an array of path assumptions by assigning an initial score to each pulse detected on the current symbol time.

The modus operandi of the module 1 for detecting the envelope of the pulses received, in relation to a threshold value, of the module 2 for determining the arrival instants of the detected pulses and of the module 4 for processing the path assumptions, is executed in accordance with the method of the invention, such as described previously in the description.

In a particularly advantageous manner, it is indicated that the threshold value AT is an adaptive value for each symbol time, for example, as a function of an adjustment value of the threshold value.

The threshold value can be adjusted in accordance with the solutions of the prior art, for the detection of pulses with constant false alarm rate, CFAR. According to another aspect, the adjustment value of the threshold value can be representative of the density of the path assumptions.

It is understood, in particular, with reference to FIG. 4, that the module 4 for processing the path assumptions comprises, for example, a routine for evaluating the threshold value for each symbol time following the current symbol time, as a function of the density of the path assumptions. Thus, by way of nonlimiting example, the threshold value can be decreased as a function of the number of detected path assumptions, having regard to the forecastable decrease in the energy contained in each pulse corresponding to these path assumptions, and, conversely, increased during a decrease in the aforesaid density. This modus operandi makes it possible to take account of the variability of the transmission channel.

Finally, the invention also covers a computer program product, recorded on a storage medium, for execution by the processor of a computer or of a dedicated receiver.

The corresponding computer program product is noteworthy in that it comprises a series of instructions allowing the implementation of the pulse transmission propagation path detection method, such as described previously in the description, in conjunction with FIGS. 2 to 3D.

Preferably, as represented furthermore in FIG. 4, the computer program product which is the subject of the invention is installed, in modular form, in an ultra wideband receiver, in accordance with the subject of the invention.

Thus, it includes at least one software module $M_1$ for detecting the envelope of the pulses received in relation to a threshold value and making it possible to generate detected pulses, the aforesaid software program module $M_1$ being subdividable into an envelope detection sub-module and a sub-module for comparing with the adaptive threshold value AT.

It furthermore comprises a software module $M_2$ for calculating and allocating, to each detected pulse, a date or arrival instant that is relative and local to the symbol time and for storing an array of arrival dates. The corresponding software module allows the allocation of a local precise arrival date relative to the symbol time for each detected pulse.

Finally, the program product, which is the subject of the invention, comprises a software module $M_3$ for constructing and updating on the basis of the array of arrival dates an array of path assumptions by assigning a score of a specific value to each pulse detected on the current symbol time. The module $M_3$ is advantageously installed in the module for processing the array of path assumptions bearing the reference 4 in the aforesaid FIG. 4.

The invention claimed is:

1. A method for detecting propagation paths in pulse transmission, the signal received including pulses over symbol times, wherein following the synchronization of the reception of the pulses to pulses with which a path is associated, the method includes at least the steps consisting in:
   determining the arrival instant of at least one of the pulses received during current symbol time;
   generating path assumptions associated with the determined arrival instants, by assigning an initial score to each of the determined arrival instants;
   determining the arrival instant of at least one pulse received during at least one symbol time following the current symbol time;
   comparing, in a relative manner, the arrival instant of the pulse received during the following symbol time with the arrival instants associated with the path assumptions; and
   updating the scores assigned to the arrival instants associated with the path assumptions as a function of the result of the relative comparison.

2. The method as claimed in claim 1, wherein the determination of an arrival instant of the pulses consists at least in:
   detecting the envelope of the pulses in relation to a threshold value; and, on positive detection,
   associating at least one arrival instant with a detected pulse.

3. The method as claimed in claim 1, wherein the relative comparison consists at least in:
   establishing time windows of determined width about the arrival instants of the path assumptions;
   verifying whether the pulses of the following symbol time are in at least one of the time windows.

4. The method as claimed in claim 1, wherein the method includes at least the generation of a new path assumption, upon a relative inconsistency between the arrival instant of a pulse of the following symbol time and the arrival instants of the path assumptions by assigning an initial score to the pulse dated from the following symbol time.

5. The method as claimed in claim 1, wherein the updating of the score assigned to each path assumption, after comparison over N following symbol times includes at least:

the merging of the path assumptions whose reception time windows overlap, the most recent arrival instant and the highest score being preserved.

6. The method as claimed in claim 1, the method consisting in updating the path assumptions and their score by repeating the steps of path assumption generation and score assignment, by substituting the current symbol time with a symbol time following the current symbol time.

7. The method as claimed in claim 1, the method consisting in replacing the symbol time with a temporal subdivision of the symbol time.

8. A reception method of signals emitted by pulses, the reception method comprising:

detecting propagation paths in pulse transmission, the signal received including pulses over symbol times, the detecting following the synchronization of the reception of the pulses to pulses with which a path is associated at least including determining the arrival instants of at least one pulse received during a current symbol time, generating path assumptions associated with the determined arrival instants, by assigning an initial score to each of the determined arrival instants, determining the arrival instants of at least one pulse received during at least one symbol time following the current symbol time, comparing in a relative manner the arrival instants of the pulse received during the following symbol time with arrival instants associate with the path assumptions, updating the scores assigned to the arrival instants associated with the path assumptions as a function of the relative comparison; and selecting a determined number of path assumptions from among those whose score is the highest, to ensure reception.

9. A device for detecting propagation paths in pulse transmission, the signal received including pulses over symbol times, wherein, in addition to a module for synchronizing the reception of these pulses to pulses with which a path is associated, the device comprises at least:

means for determining the arrival instant of at least one of the pulses received during a current symbol time;

means for generating path assumptions associated with the determined arrival instants, the generating means assigning an initial score to each of the determined arrival instants;

means for determining the arrival instant of at least one of the pulses received during at least one symbol time following the current symbol time;

means for relative comparison of the arrival instants of the pulses received during the following symbol time with the arrival instants associated with the path assumptions;

means for updating the scores assigned to the arrival instants associated with the path assumptions as a function of the result of the relative collation.

10. A receiver of signals emitted by pulses, comprising at least one antenna for receiving pulses, wherein, in addition to the means for synchronizing reception to a pulse received, the receiver includes at least:

means for determining the arrival instants of pulses over a symbol time;

means for generating path assumptions associated with determined arrival instants, the generating means thereby assigning an initial score to each of the determined arrival instants;

means for relative comparison of the arrival instants of pulses received during a current symbol time with the arrival instants associated with the path assumptions;

means for updating the scores assigned to the arrival instants associated with the path assumptions as a function of the result of the relative comparison.

11. A computer program recorded on a non-transitory computer-readable storage medium, wherein the computer program comprises a series of instructions allowing the implementation of a method for detecting propagation paths, when the program is executed by a processor, the method including at least the steps consisting in:

determining the arrival instant of at least one pulse received during a current symbol time;

generating path assumptions associated with the determined arrival instants, by assigning an initial score to each of the determined arrival instants;

determining the arrival instants of at least one pulse received during at least one symbol time following the current symbol time;

comparing, in a relative manner, the arrival instants of the pulse received during the following symbol time with the arrival instants associated with the path assumptions; and updating the scores assigned to the arrival instants associated with the path assumptions as a function of the result of the relative comparison.

\* \* \* \* \*